United States Patent [19]

Noir et al.

[11] Patent Number: 4,770,037

[45] Date of Patent: Sep. 13, 1988

[54] METHOD FOR DETERMINING THE FLOW OF A FLUID

[75] Inventors: Dominique Noir, Aubonne; Jean-Louis Prost, Geneva, both of Switzerland

[73] Assignee: Battelle Memorial Institute, Geneva, Switzerland

[21] Appl. No.: 35,487

[22] Filed: Apr. 7, 1987

[30] Foreign Application Priority Data

Apr. 8, 1986 [CH] Switzerland ............... 01369/86

[51] Int. Cl.$^4$ ................................. G01F 1/68
[52] U.S. Cl. ......................................... 73/204
[58] Field of Search ................................ 73/204

[56] References Cited

U.S. PATENT DOCUMENTS

| | | | |
|---|---|---|---|
| 3,498,128 | 3/1970 | Calvet | 73/204 |
| 3,587,318 | 6/1971 | Belugou | 73/204 |
| 3,719,083 | 3/1973 | Morris et al. | 73/204 |
| 4,297,881 | 10/1981 | Sasayama et al. | |
| 4,402,012 | 8/1983 | Knight | |
| 4,501,145 | 2/1985 | Boegli | 73/204 |

Primary Examiner—Herbert Goldstein
Attorney, Agent, or Firm—Cushman, Darby & Cushman

[57] ABSTRACT

The flow rate of a fluid, e.g. hot water, is determined by measuring the temperature of the fluid and the cooling time between two temperature thresholds of a previously heated probe. On the basis of these values, by way of a first interpolation based on a table comprising the cooling times of the probe as a function of different temperatures and flow rates, the cooling times at the temperature measured are calculated for all the flow rates recorded on the table, then, by way of a second interpolation between the values thus calculated which are higher and lower than the value measured, the flow rate corresponding to this value is calculated.

8 Claims, 2 Drawing Sheets

METHOD FOR DETERMINING THE FLOW OF A FLUID

BACKGROUND OF THE INVENTION

The present invention relates to a method for determining the flow of a fluid flowing in a pipe by measuring the temperature of the fluid and the time needed for a probe, which is brought to a first temperature different from that of the fluid, to be brought to a second temperature closer to that of the fluid.

Various solutions have already been proposed for determining the flow of a fluid in a pipe on the basis of the heat exchange between a probe and the fluid. In general, this involves using a probe of which the variation of electrical resistance is measured as a function of temperature. This is a principle based on that of the hot-wire anemometer.

This kind of flow meter is described notably in the GB Pat. No. 1 345 324. According to this patent, the heating power of the probe is supplied by a series of identical impulses separated by intervals which are sufficiently long to ensure that the probe has returned to its temperature of equilibrium with the fluid at the beginning of each impulse. The variations in flow are detected by variations recorded from one impulse to the next in the rate of change of electrical resistance in the probe during an impulse. The rate of change of resistance is given by the variation of voltage derived from a thermistor immersed in the fluid. The voltage is applied to a voltage-frequency converter, the frequency of which diminishes continuously in proportion to the progressive reduction of voltage. Then, the frequency arising during the duration of the impulse is measured and the flow calculated.

From the electronic point of view, the majority of the signal processing is analog, which leads to a relatively complex, and hence a relatively costly, electronic circuit. Moreover, the transformation of voltage to variable frequency covers a rather narrow range of measurements. This is equally true as regards impulses for heating with a constant strength.

A simplification has been proposed, comprising measuring a time difference between two determined temperature thresholds and then calculating the flow with the aid of exponential equations. Such solutions are described notably in U.S. Pat. No. 3,498,128 and EP-A1 No. 0070 801.

Apart from the fact that the solving of exponential equations is, from the electronic point of view, still a relatively complex solution, it has been shown that the exponential cooling curves of the probe vary not only according to the flow of the fluid, but also in relation to the temperature of the fluid, hence the need to take temperature into account when solving these equations.

Conventional thermal energy consumption meters measure, on the one hand, the difference in temperature between the inlet and the outlet of the heating apparatus and, on the other hand, the flow by a conventional water flowmeter, for example a turbine flowmeter. In this kind of apparatus, although the precision of the flow measurement is satisfactory at high flow rates, it becomes mediocre at low flow rates (below 10-20% of the nominal flow) which are the most frequent in central heating installations.

There is a market in the field of meters for the consumption of thermal energy distributed in the form of a fluid, notably in the field of hot water consumption meters of an installation for collective central heating or for distributing hot water for sanitation. Again, the price of the meter has to be acceptable, i.e. capable of being paid off in a few years with the savings which will be made possible by such an installation, consequent on the effective distribution of the charges with relation to the energy consumed and not, as previously, in proportion to the volume occupied. This method of charging is an incentive to save in so far as each person is responsible for their own consumption. This method of charging is becoming legally obligatory, at least in new accommodation, in certain countries.

The aim of the present invention is to provide a flow measurement method and apparatus which are both accurate and sufficiently simple to be applicable in the above-mentioned areas, where price and accuracy are two factors which must be compatible, as well as being applicable in industry and to fluids other than liquids, notably steam.

SUMMARY OF THE INVENTION

To this end, the invention provides a method of determining the flow of a fluid flowing in a pipe by measuring the temperature of the fluid and measuring the time needed for a probe, brought to a first temperature which differs from that of the fluid, to be brought to a second temperature closer to that of the fluid, characterised in that there are shown in a calibration table comprising n columns of increasing temperatures and x rows of increasing flow rates, the time differences corresponding to the time taken by the probe to change from the first to the second temperature at determined temperatures of the fluid and characteristic of corresponding flow rates of the fluid at the respective determined temperatures, the values of the time differences characteristic of the measured temperature of the fluid are calculated by a first interpolation, the two time differences respectively above and below the measured time difference, characteristic of flow rates greater and smaller respectively than the flow rate being tested, are identified, and the flow rate value to which the measured time difference corresponds is determined by a second interpolation between the two calculated time differences.

The basis used in this method is the same as that of the known solutions, i.e. the temperature of the fluid and the time difference between two threshold temperatures after the probe has received an energy impulse which changes its temperature to a different temperature from that of the fluid. The difference lies in the use of a method of double interpolation which is simple to execute in electronic terms and which makes it possible to take into account the variation between the exponential curves at different flow rates and temperatures, thereby ensuring a precison of the order of about 1 to 2%.

BRIEF DESCRIPTION OF THE DRAWINGS

The attached drawings illustrate diagrammatically and by way of example only, an embodiment of the method of the present invention. In the drawings.

DESCRIPTION OF PREFERRED EMBODIMENTS

Figure 1:
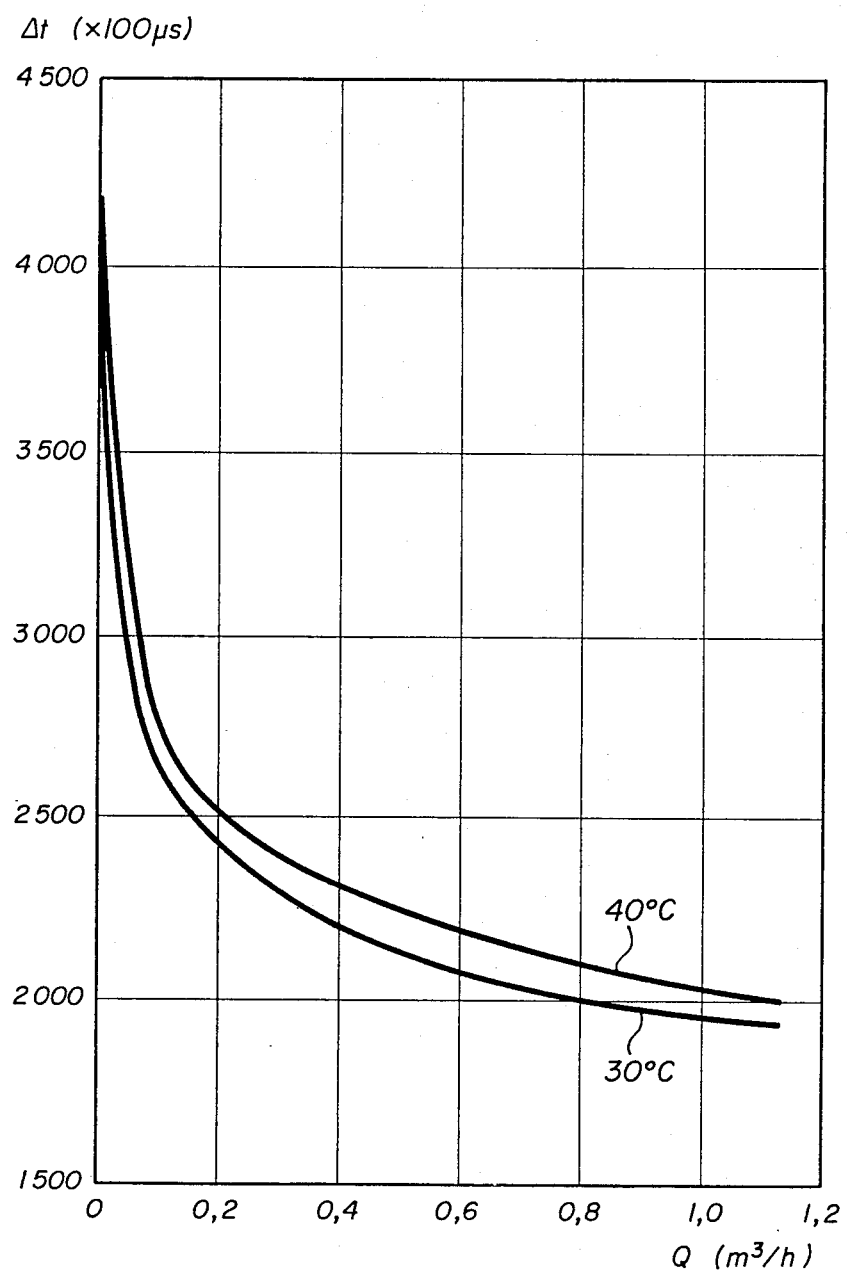
FIG. 1 is a diagram of the probe cooling time differences with relation to the fluid flow, for two different temperatures of the fluid.

FIG. 1 shows the fluid flow Q in m³/h as abscissa, as a function of the probe cooling time differences Δt, of which unity is here 100 μs as ordinate. This diagram indicates the time differences or delays necessary for cooling a probe, heated to a temperature $T_1$ 15° C. above the temperature of the fluid, to a second temperature threshold $T_2$ closer to the temperature of the fluid. This diagram shows two curves obtained from fluids the temperatures of which are respectively 30° C. and 40° C.

This diagram clearly shows that the measured time difference depends not only on the flow but also, in a non-negligible manner, on the temperature of the fluid, hence the considerable inaccuracy which arises from the use of exponential equations.

In performing the present method, initially a calibration table is drawn up comprising n columns relating to respective increasing temperatures, for a hot water circuit for example, for every 10° C. between 20° C. and 90° C., and x rows relating to respective increasing flow rates between 0 and 1.1 m³/h at intervals of 0.1 m³/h; in the table are entered the respective reference values of the characteristic time differences measured to pass from the temperature $T_1$ to $T_2$, for each combination of fluid temperature and flow rate. This table is the reference. The zero flow rate in this table allows the probe to be calibrated, since it suffices to measure the cooling time of the probe between the temperatures $T_1$ and $T_2$ in a fluid of a known temperature and to compare this time with that of the reference table. A correction factor may thus be determined in order to take into account the difference between the reference value and the actual cooling time of the probe.

The table below illustrates by way of example the time differences for two temperatures of the fluid namely 30° C. and 40° C., as a function of the flow rates from 0 to 1.1 m³/h. Obviously other temperatures may be filled in on the table, since the principles for determining the flow remains the same.

REFERENCE TABLE

| Q = m³/h \ °C. | 30 | 40 |
|---|---|---|
| 0 | 4050 | 4180 |
| 0.1 | 2660 | 2740 |
| 0.2 | 2425 | 2515 |
| 0.3 | 2300 | 2395 |
| 0.4 | 2200 | 2315 |
| 0.5 | 2130 | 2250 |
| 0.6 | 2080 | 2195 |
| 0.7 | 2035 | 2145 |
| 0.8 | 2000 | 2110 |
| 0.9 | 1980 | 2065 |
| 1.0 | 1960 | 2035 |
| 1.1 | 1945 | 2010 |

The value of the unit of time difference, which is 100 μs in this case, is determined in relation to the required degree of accuracy. Since the slope of the curves is reduced sharply when the flow increases, the time unit is chosen to have at least one unit per % of flow at the highest flow rate and at the lowest temperature where sensitivity is at the lowest. As shown in the table at 30° C., between the flow rates of 1.0 and 1.1 m³/h, there are 15 time units, i.e. 1.5 unit per % of flow.

The table is used by double interpolation. By way of example, it is supposed that a temperature of the fluid of 37° C., and a time difference of 2225 units for cooling of the probe between the temperatures $T_1$ and $T_2$, are measured. The first operation consists of calculating by interpolation a column of time differences for the temperature of 37° C. This will include the following particular results:

$$2200 + \frac{(2315 - 2200) \cdot 7}{10} = 2280$$

for a flow rate of 0.4 m³/h and $$2130 + \frac{(2250 - 2130) \cdot 7}{10} = 2214$$

for a flow rate of 0.5 m³/h.

The second operation consists of identifying the two calculated values on either side of the measured time difference, and of interpolating between these two values, in our example 2280 at 0.4 m³/h and 2214 at 0.5 m³/h, to obtain the flow rate Q corresponding to the measured time difference:

$$Q = (0.5 - x) \, m^3/h \text{ where}$$

$$\frac{2225 - 2214}{2280 - 2214} = \frac{x}{0.1}$$

$$\frac{11}{66} = \frac{x}{0.1}$$

$$0.1 \, m^3/h = 6x$$

$$Q = 0.5 - 0.016 = 0.484 \, m^3/h.$$

Although, as is seen, the functions are not linear, the error which may be introduced by the described method of interpolation is extremely small on the level of calculation, taking into account the small intervals between the values in the table. In the case of the example chosen, the table comprises 12 lines and 8 columns (between 20° C. and 90° C.), so that there are only 96 values of four figures each to be stored, which requires a small memory capacity and hence inexpensive components, which is important in the case of domestic applications in particular.

To carry out this type of measurement, it is important to use a probe with a low thermal capacity and a low time constant. For application to the flow meter, a platinum probe is chosen, of which the coefficient of variation of electrical resistance as a function of temperature is positive, constant and equal to 0.385%/°C. For the application considered and in order to fulfil the above requirements, a probe of small dimensions is chosen, the probe being composed of a thin layer deposited on a substrate and not covered by a ceramic, glass or metal protective envelope. Such probes are available commercially and include Degussa probes, type F 2101, Minco, type S260 PD, Heraeus, type 1 Pt 100 FKG 1030.6 or Jumo type PC 1.32 10.1. The dimensions of this probe are, by way of example, 10×3×1 (mm, 1×w×t) and the time constant is of the order of 0.3 s in water at 0.2 m/s.

Figure 2:
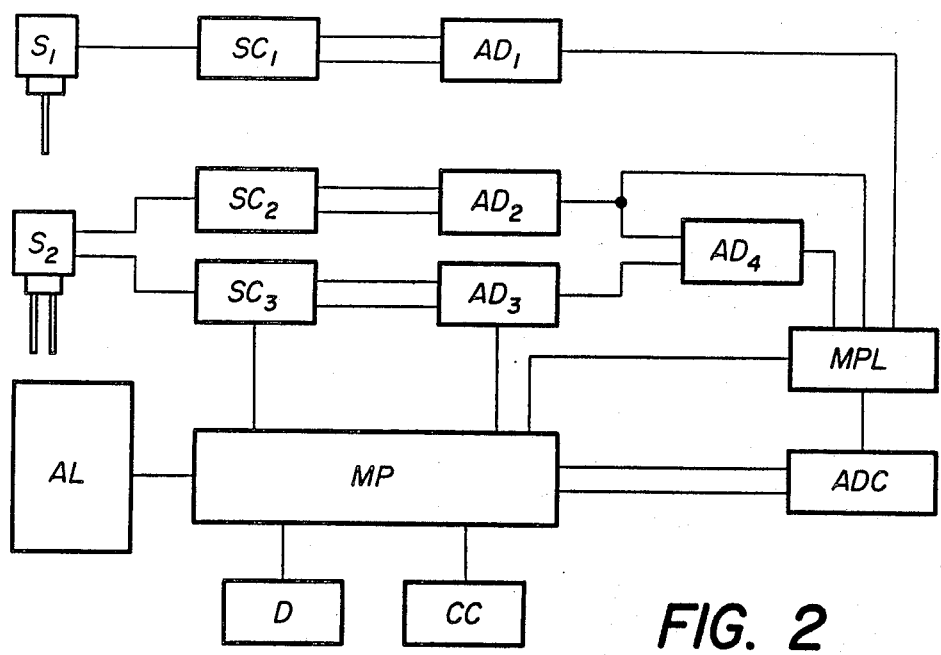
FIG. 2 is a block diagram of electronic means for processing the measurement signals from the probe.

The apparatus illustrated by the block diagram of FIG. 2, illustrating the application of the method to a heat meter, comprises two probes $S_1$ and $S_2$ disposed respectively in the inlet pipe and in the outlet pipe of a central heating circuit. The probe $S_1$ only measures the inlet temperature of the fluid, and to this end is connected to a measurement current source $SC_1$ of 5 mA which generates heating of less than 0.05° C. in still water. A differential amplifier $AD_1$ amplifies the measurement signal and transmits it to a multiplexer MPL.

The probe $S_2$ measures the outlet temperature of the fluid and the cooling time for cooling of the probe, when heated to a temperature higher than that of the fluid, to a second temperature closer to that of the fluid by heat exchange with the latter.

The probe $S_2$ is double, as illustrated in FIG. 2. One of the elements of this probe is connected to a current source $SC_2$ which, like the source $SC_1$, provides a continuous current of 5 mA, corresponding to a measurement current of the voltage of the probe proportional to the resistance, which is per se a function of the fluid temperature. The other element of the double probe $S_2$ is connected to a source $SC_3$ which supplies the probe in alternation with a heating current of 150 mA and a measurement current of 5 mA while the element is being cooled by the flow of the fluid. The two sources $SC_2$ and $SC_3$ are connected to two differential amplifiers, $AD_2$ and $AD_3$ respectively. The second of these amplifiers $AD_3$ adapts its gain from 1 to 30, consequent on the source $SC_3$ being of 5 mA or 150 mA, corresponding to the measurement or heating periods of the element of the probe $S_2$, in order to keep the gain constant. The source $SC_3$ and the amplifier $AD_3$ are to this end connected to the microprocessor MP which comprises the program which sets, in particular, the periodicity of the commutation between the measurement current and the heating current, as well as the periodicity of the respective gains of the differential amplifier $AD_3$ synchronised with the source current $SC_3$. The two differential amplifiers $AD_2$, $AD_3$ are connected to another differential amplifier $AD_4$ which indicates to the multiplexer MPL the value of the time interval taken by the element of the probe $S_2$, after being heated, to pass from the temperature $T_1$ to the temperature $T_2$, thus providing the microprocessor with the necessary time difference for calculating the above-mentioned interpolation. The output of the differential amplifier $AD_2$ is also connected to the multiplexer MPL to indicate to the latter the fluid temperature at the outlet of the heating installation. The output of the multiplexer is connected to the microprocessor MP and to a 10-bit ADC analog-digital converter, which is also connected to the microprocessor MP, the outputs of which lead to a display D and a control command CC. The whole circuit is supplied by a general supply AL. The control command CC serves to select the value to be made to appear on the display unit D. Given that it receives the inlet and outlet temperatures and calculates the flow rate of the fluid, the microprocessor can also calculate the energy consumption in kW. It is thus possible to select one of the values to be made to appear with the aid of the control command CC.

Figure 3:
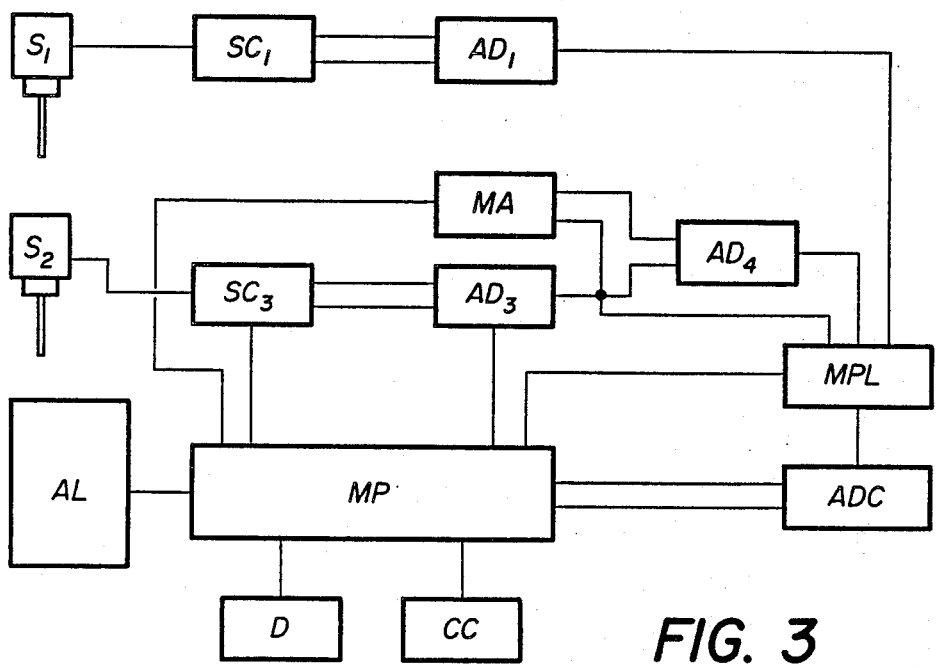
FIG. 3 is a block diagram of a variant of the electronics of FIG. 2.

The block diagram illustrated in FIG. 3 is a variant of the preceding figure in which the probe $S_2$ only comprises a single sensor and is thus only supplied by the current source $SC_3$, the current source $SC_2$ and the differential amplifier $AD_2$ being omitted. In this case, the source connects alternately to a heating power of 150 mA and a measurement power of 5 mA. After an interruption sufficient to bring the probe to the temperature of the fluid, a new cycle is preceded by the measurement of the fluid temperature and its being stored in an analog memory MA which replaces the second sensor and keeps the value of the voltage proportional to the resistance of the probe $S_2$ characteristic of the fluid temperature. The memory is connected on the one hand to the microprocessor MP, and on the other hand to the differential $AD_4$ and to the multiplexer MPL. The rest of the circuit is similar to that in FIG. 2.

We claim:

1. A method of determining the flow rate of a fluid flowing in a pipe, the method comprising the steps of:
    (1) determining an array of time difference reference values, each value in said array defining a measure of the time required for a first temperature measuring probe to cool from a temperature $T_1$, to a temperature $T_2$ as a function of a specified fluid flow rate and fluid temperature;
    (2) contacting said first temperature measuring probe with the flowing fluid;
    (3) contacting a second temperature measuring probe with the flowing fluid;
    (4) heating said first probe to temperature $T_1$;
    (5) measuring the temperature of said fluid by use of said second probe;
    (6) measuring the time required for said first probe to cool from $T_1$ to $T_2$; and
    (7) interpolating between said values, in said array, to calculate the flow rate corresponding to said cooling time and said fluid temperature.

2. The method of claim 1 wherein each of said probes has a time constant on the order of 0.3 s in water flowing at 0.2 m/s.

3. The method of claim 1 wherein $T_1$ is about 15° C. above the temperature of the flowing fluid.

4. The method of claim 1 wherein the time difference reference values in said array are selected in relation to the degree of accuracy required for interpolation, and taking into account the smallest time difference recorded between two successive time differences in the array.

5. An apparatus for determining the flow rate of a fluid in a pipe comprising:
    first probe means, immersed in said fluid, for indicating the temperature of said first probe;
    second probe means immersed in said fluid for measuring the temperature of said fluid $T_0$;
    means for storing an array of time difference values, each value in said array defining a measure of the time required for the first probe means to cool from a temperature $T_1$ to a temperature $T_2$ at a specified fluid flow rate and temperature;
    means for raising the temperature of said first probe means to a temperature $T_1$;
    means for setting a second temperature value $T_2$ of said first probe means;
    means for measuring the time which elapses as the first probe means cools from $T_1$ to $T_2$;
    means for interpolating between the time difference values in said array to calculate the flow rate corresponding to the measured values of $T_0$ and said elapsed time.

6. The apparatus of claim 5 wherein each of said probe means has low thermal capacity and a low time constant.

7. The apparatus of claim 6 comprising platinum probes having a coefficient of variation of electrical resistance as a function of temperature which is positive, constant and equal to 0.385/° C.

8. An apparatus for determining the flow rate of a fluid in a pipe comprising:

first probe means, immersed in said fluid, for indicating the temperature of said first probe;

second probe means, immersed in said fluid, for measuring the temperature of the fluid, $T_0$;

microprocessor means for storing an array of time difference values, each value in said array defining a measure of the time required for the first probe means to cool from a temperature $T_1$ to a temperature $T_2$ at a specified fluid flow rate and fluid temperature; for raising the temperature of said first probe means to a temperature $T_1$; for setting a second temperature value $T_2$ of the first probe means; for measuring the time which elapses as the first probe means cools from $T_1$ to $T_2$; and for interpolating between the time difference values in the array to calculate the flow rate corresponding to said cooling time and said fluid temperature.

* * * * *